US010728451B2

(12) United States Patent
Tokunaga

(10) Patent No.: US 10,728,451 B2
(45) Date of Patent: Jul. 28, 2020

(54) COMMUNICATION DEVICE FOR COMMUNICATING WITH EXTERNAL DEVICE, METHOD FOR CONTROLLING THE SAME, AND RECORDING MEDIUM

(71) Applicant: CANON KABUSHIKI KAISHA, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/380,770

(22) Filed: Apr. 10, 2019

(65) Prior Publication Data

US 2019/0327422 A1 Oct. 24, 2019

(30) Foreign Application Priority Data

Apr. 20, 2018 (JP) ................................. 2018-081160

(51) Int. Cl.
*H04N 5/232* (2006.01)
*G08B 25/10* (2006.01)
*G08B 25/08* (2006.01)

(52) U.S. Cl.
CPC ....... *H04N 5/232411* (2018.08); *G08B 25/08* (2013.01); *G08B 25/10* (2013.01); *H04N 5/23203* (2013.01)

(58) Field of Classification Search
CPC ......... H04N 5/232411; H04N 5/23203; H04N 7/15; G08B 13/196; G08B 25/10; G08B 25/08
See application file for complete search history.

(56) References Cited

U.S. PATENT DOCUMENTS

| 2008/0060032 A1* | 3/2008 | Toutenhoofd | ...... H04N 1/00209 725/105 |
| 2011/0289136 A1* | 11/2011 | Klassen | ............. H04N 1/32101 709/203 |
| 2012/0249808 A1* | 10/2012 | Hirota | ................ H04N 1/00159 348/207.1 |
| 2013/0242034 A1* | 9/2013 | Kato | ...................... H04N 7/152 348/14.08 |

(Continued)

FOREIGN PATENT DOCUMENTS

| JP | 2008-295073 A | 12/2008 |
| JP | 2008295073 A | * 12/2008 |

*Primary Examiner* — Nhan T Tran
(74) *Attorney, Agent, or Firm* — Canon U.S.A., Inc., IP Division

(57) ABSTRACT

A communication device includes a recording unit that records an image and a reduced image corresponding to the image, a first communication unit, a second communication unit with a faster communication speed, a setting unit that sets an external device connected via the first communication unit or the second communication unit, and a control unit that performs control such that the reduced image is transmitted, via the first communication unit, to the external device set as the device connected via the first communication unit and the image is transmitted, via the second communication unit, to the external device set as the device connected via the second communication unit in a case where an instruction for transmitting the image has been received from the external device set as the external device connected via the first communication unit.

14 Claims, 7 Drawing Sheets

(56) References Cited

U.S. PATENT DOCUMENTS

| | | | | |
|---|---|---|---|---|
| 2015/0097757 A1* | 4/2015 | Bang | ............... | G06F 3/1454 |
| | | | | 345/2.2 |
| 2017/0142318 A1* | 5/2017 | Tanaka | ............... | H04N 5/2253 |
| 2017/0372573 A1* | 12/2017 | Park | ............... | H04N 7/185 |
| 2018/0213182 A1* | 7/2018 | Kim | ............... | H04N 21/2353 |
| 2018/0234505 A1* | 8/2018 | Humbert | ............... | G06F 3/1454 |
| 2018/0352156 A1* | 12/2018 | Garrido | ............... | H04N 7/147 |

* cited by examiner

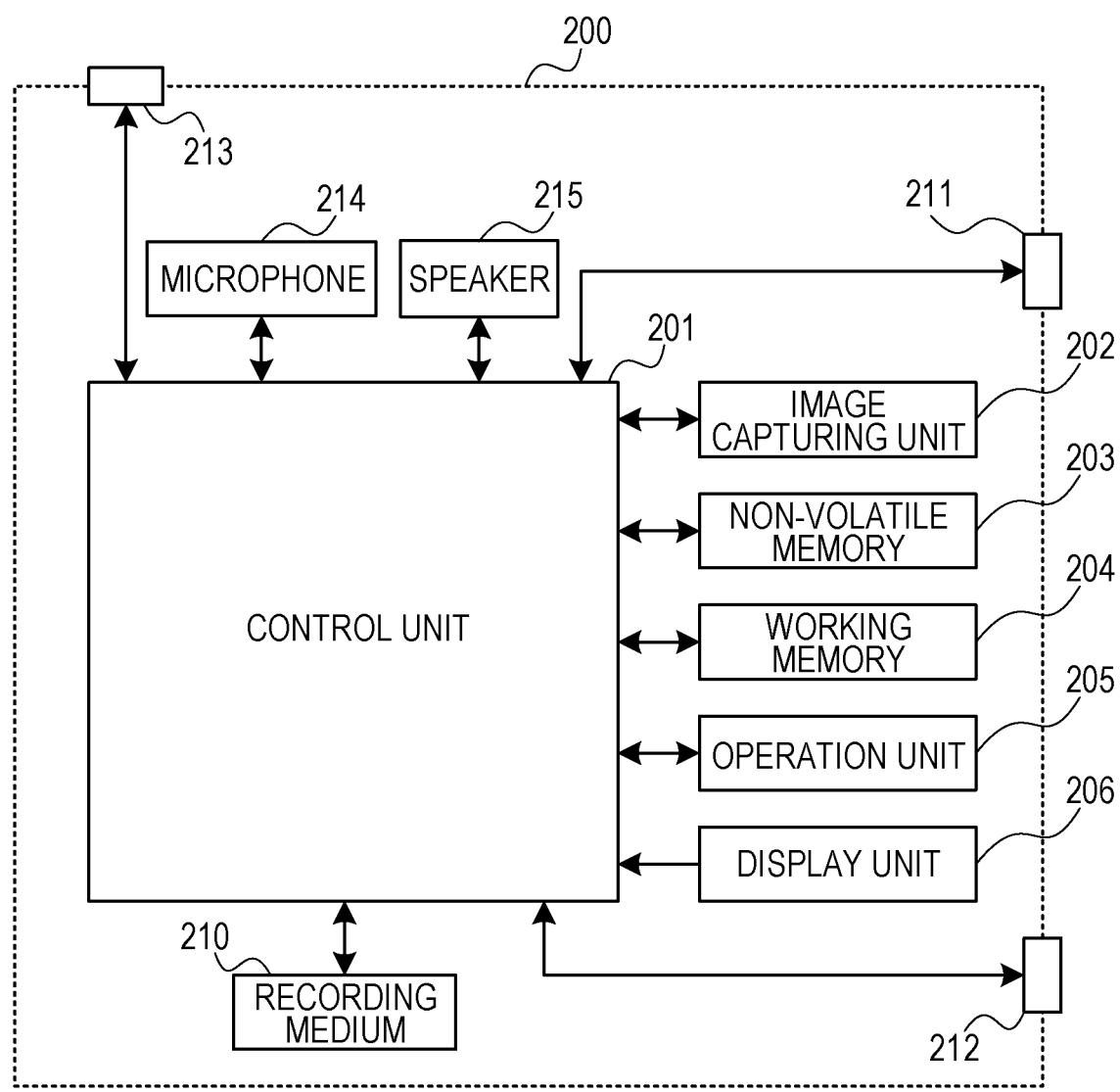

COMMUNICATION DEVICE FOR COMMUNICATING WITH EXTERNAL DEVICE, METHOD FOR CONTROLLING THE SAME, AND RECORDING MEDIUM

BACKGROUND

Field

The present disclosure relates to a communication device for communicating with an external device, the method for controlling the communication device, and a recording medium.

Description of the Related Art

For an intended use in a service using an image highly likely to be utilized promptly, such as a newspaper publisher, an image transmission system for transmitting an image shot in the field to a transmission destination as soon as possible has been implemented (Japanese Patent Laid-Open No. 2008-295073).

For example, a method is conceivable, in which a shot image is transmitted once to, for example, a PC, from a digital camera or a digital video camera equipped with a communication function via a wireless LAN and is transmitted to a server configured to manage the image after image editing or sorting.

Other examples include a method in which two digital cameras, including one digital camera dedicated to shooting and another digital camera dedicated to transmission, are used and a media card is refitted from the camera dedicated to shooting to the camera dedicated to transmission to transmit the image to the image management server.

However, in the above-described methods, shooting and image transmission using a power-consuming communication unit such as the wireless LAN are performed simultaneously. For this reason, a battery powering the devices being used can be quickly drained, resulting in the need to have spare batteries available. In a case where image transmission cannot be performed as long as shot images are not accumulated and the media are not refitted, immediacy of image utilization is lost.

SUMMARY

A communication device includes a recording unit configured to record an image and a reduced image corresponding to the image, a first communication unit, a second communication unit with a faster communication speed than that of the first communication unit, a setting unit configured to set, for each communication unit, an external device connected via the first communication unit or the second communication unit, and a control unit configured to perform control such that the reduced image is transmitted, via the first communication unit, to the external device set as the external device connected via the first communication unit and the image is transmitted, via the second communication unit, to the external device set as the external device connected via the second communication unit in a case where an instruction for transmitting the image corresponding to the reduced image has been received from the external device set as the external device connected via the first communication unit. Power consumption of the first communication unit is lower than power consumption of the second communication unit. The external device set as the external device connected via the first communication unit and the external device set as the external device connected via the second communication unit are different devices.

Further features will become apparent from the following description of exemplary embodiments with reference to the attached drawings.

BRIEF DESCRIPTION OF THE DRAWINGS

FIG. 2 is a block diagram of a configuration example of a mobile phone as a digital camera partner machine implementable as an information processing device and an image management server according to the embodiment.

DESCRIPTION OF THE EMBODIMENTS

Hereinafter, exemplary embodiments will be described in detail with reference to the attached drawings.

Note that the below-described embodiments are mere examples, and modifications or Changes can be made as necessary according to specific configuration of a device to which the embodiments are applied. The embodiments can be combined as necessary.

First Embodiment

<Configuration of Digital Camera 100>

In description below, a digital camera having a wireless communication function will be described as one example of a communication device as a data transfer source. The present disclosure is applicable to an optional device having a wireless communication function and configured so that data can be transferred. Such a terminal includes, for example, a mobile phone, a personal computer, a tablet terminal, and a game machine, but may include other apparatuses. These apparatuses preferably include image capturing units, but such a unit is not necessarily provided as long as the apparatus has the function of taking image data from, e.g., a digital camera.

Figure 1A:
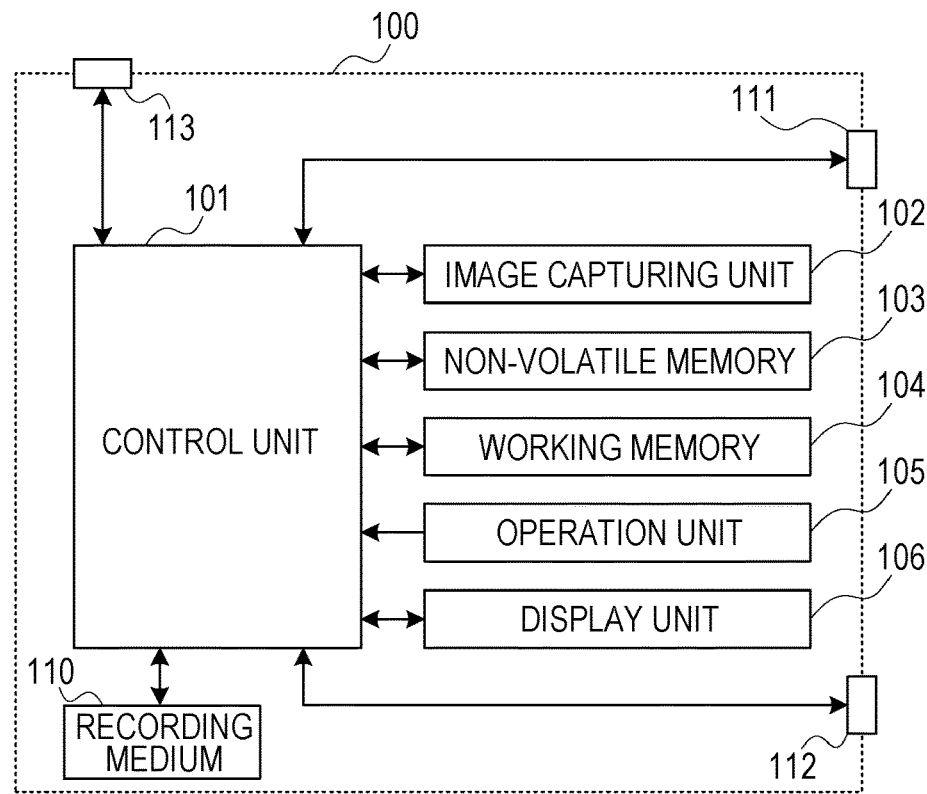
FIGS. 1A to 1C area block diagram and views of a functional configuration example of a digital camera as one example of a communication device according to an embodiment.

FIG. 1A is a block diagram of a configuration example of a digital camera 100 as one example of the communication device of the present embodiment. Note that the digital camera will be described herein as one example of the communication device, but the communication device is not limited to above. For example, the communication device may be an information processing device such as a mobile media player, a so-called tablet device, or a personal computer.

A control unit 101 is configured to control each unit of the digital camera 100 according to an input signal and a later-described program. Note that instead of controlling the entirety of the device by the control unit 101, multiple types of hardware may share processing to control the entirety of the device.

An image capturing unit 102 includes, for example, an optical lens unit, an optical system configured to control, e.g., aperture stop/zoom/focus and an image capturing element configured to convert light (video) having entered via the optical lens unit into an electrical video signal. Generally, a complementary metal oxide semiconductor (CMOS) or a charge coupled device (CCD) is utilized as the image capturing element. The image capturing unit 102 is controlled by the control unit 101 to convert object light formed via a lens included in the image capturing unit 102 into an electrical signal by the image capturing element, thereby performing, e.g., noise reduction processing and outputting digital data as image data. In the digital camera 100 of the present embodiment, the image data is recorded in a recording medium 110 according to design rule for camera file system (DCF) standards.

A non-volatile memory 103 is an electrically-deletable/recordable non-volatile memory, and is configured to store, e.g., the later-described program to be executed by the control unit 101.

A working memory 104 is used as a buffer memory configured to temporarily hold the image data captured by the image capturing unit 102, a memory for an image to be displayed on a display unit 106, or a working area of the control unit 101.

An operation unit 105 is used to receive an instruction for the digital camera 100 from a user. The operation unit 105 includes, for example, a power button configured to provide, by the user, an instruction for powering ON/OFF the digital camera 100, a release switch configured to provide an instruction for shooting, and a reproducing button configured to provide an instruction for reproducing the image data. Further, the operation unit 105 includes an operation member such as a connection button dedicated to starting communication with an external apparatus via, e.g., a later-described communication unit 111. Moreover, the operation unit 105 also includes a touch panel formed on the later-described display unit 106. Note that the release switch has SW1 and SW2. The release switch is brought into a so-called half-stroke state, and in this manner, the SW1 is turned ON. Accordingly, an instruction for preparation for shooting, such as autofocus (AF) processing, automatic exposure (AE) processing, automatic white balance (AWB) processing, and flash preliminary emission (EF) processing, is received. The release switch is brought into a so-called full-stroke state, and in this manner, the SW2 is turned ON. Accordingly, an instruction for performing shooting is received.

The display unit 106 is configured to display a viewfinder image upon shooting, display the captured image data, and display a character for dialogical operation, for example. Note that the display unit 106 is not necessarily built in the digital camera 100 as long as the digital camera 100 can be connected to the display unit 106 inside or outside the digital camera 100 and has at least the display control function of controlling displaying on the display unit 106.

The recording medium 110 can record the image data output from the image capturing unit 102. The recording medium 110 may be configured detachably from the digital camera 100, or may be built in the digital camera 100. That is, the digital camera 100 may have at least a unit configured accessible to the recording medium 110.

The communication unit 111 is an interface for connection with an external device. The digital camera 100 of the present embodiment can exchange data with the external device via the communication unit 111. For example, the image data generated in the image capturing unit 102 can be transmitted to the external device via the communication unit 111. Note that in the present embodiment, the communication unit 111 includes an interface for communicating with the external device via a so-called wireless LAN according to IEEE 802.11 standards. The control unit 101 controls the communication unit 111 to implement wireless communication with the external device. Note that a communication method is not limited to the wireless LAN, and for example, includes an infrared communication method.

A near field communication unit 112 includes, for example, an antenna for wireless communication and a modulation/demodulation circuit or a communication controller for processing a wireless signal. The near field communication unit 112 is configured to output a modulated wireless signal from the antenna and demodulate the wireless signal received by the antenna, thereby implementing near field radio communication according to IEEE 802.15 standards (Bluetooth®). In the present embodiment, Bluetooth® communication employs Bluetooth® Low Energy Version 4.0 with low power consumption. Such Bluetooth® communication has a narrower communicable area (i.e., a shorter communicable distance) than that of wireless LAN communication. The Bluetooth® communication has a slower communication speed than that of the wireless LAN communication. The Bluetooth® communication leads to lower power consumption than that of the wireless LAN communication.

In the present embodiment, a communication speed in communication implemented by the communication unit 111 is faster than a communication speed in communication implemented by the later-described near field communication unit 112. Moreover, communication implemented by the communication unit 111 is broader than communication by the near field communication unit 112 in terms of a communicable area.

A public network communication unit 113 is an interface used when public wireless communication is performed. The digital camera 100 is connected to a line such as LTE, 3G, or 4G via the public network communication unit 113, and therefore, is connected to the Internet. Thus, the digital camera 100 can communicate with other apparatuses such as a server.

Note that the communication unit 111 of the digital camera 100 in the present embodiment has an AP mode for operating as an access point in an infrastructure mode and a CL mode for operating as a client in the infrastructure mode. The communication unit 111 operates in the CL mode so that the digital camera 100 in the present embodiment can operate as a CL apparatus in the infrastructure mode. In a case where the digital camera 100 operates as the CL apparatus, the digital camera 100 can be connected to a peripheral AP apparatus to participate in a network formed by the AP apparatus. Moreover, the communication unit 111 operates in the AP mode so that the digital camera 100 in the present embodiment CM also operate as a simple AP (hereinafter referred to as a "simplified AP") which is one type of AP but has a more-limited function. When the digital camera 100 operates as the simplified AP, the digital camera 100 itself forms a network. A peripheral device of the digital camera 100 identifies the digital camera 100 as an AP apparatus, and therefore, can participate in the network formed by the digital camera 100. A program for operating the digital camera 100 as described above is held in the non-volatile memory 103.

Note that the digital camera 100 in the present embodiment is one type of AP, but is the simplified AP having no gateway function of transferring data received from the CL apparatus to, e.g., an Internet provider. Thus, even when data is received from other devices participating in the network formed by the digital camera 100 itself, such data cannot be transferred to a network such as the Internet.

Figure 1B:
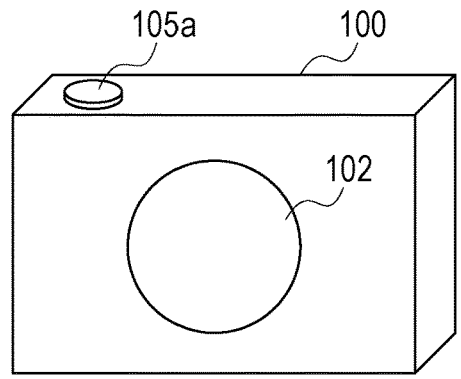
Figure 1C:
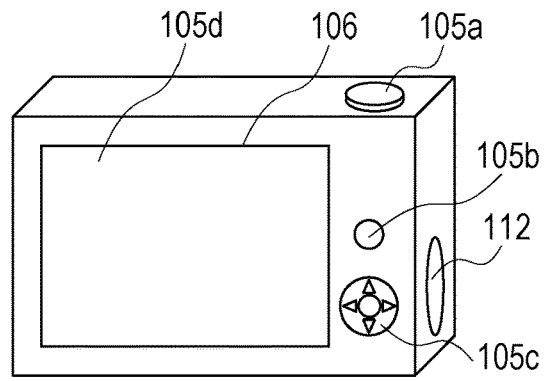

Next, an outer appearance of the digital camera 100 will be described. FIGS. 1B and 1C are views of one example of the outer appearance of the digital camera 100. A release switch 105a, a reproducing button 105b, a direction key 105c, and a touch panel 105d are operation members included in the above-described operation unit 105. Moreover, an image obtained as a result of image capturing by the image capturing unit 102 is displayed on the display unit 106.

This is description of the digital camera 100.

<Configuration of Mobile Phone 200>

FIG. 2 is a block diagram of a configuration example of a mobile phone 200 as one example of the information processing device of the present embodiment. Note that the mobile phone will be described herein as one example of the information processing device, but the information processing device is not limited to above. For example, the information processing device may be a digital camera equipped with a wireless function, a tablet device, or a personal computer (PC).

A control unit 201 is configured to control each unit of the mobile phone 200 according to an input signal and a later-described program. Note that instead of controlling the entirety of the device by the control unit 201, multiple types of hardware may share processing to control the entirety of the device.

An image capturing unit 202 is configured to convert object light formed via a lens included in the image capturing unit 202 into an electrical signal, thereby performing, e.g., noise reduction processing and outputting digital data as image data. The captured image data is stored in a buffer memory, and then, is recorded in a recording, medium 210 after predetermined calculation has been performed in the control unit 201.

A non-volatile memory 203 is an electrically-deletable/recordable non-volatile memory. The non-volatile memory 203 records an operating system (OS) as basic software to be executed by the control unit 201 and an application for implementing an applicative function in cooperation with the OS. Moreover, in the present embodiment, the non-volatile memory 203 stores an application for communication with the digital camera 100.

A working memory 204 is used as e.g., a memory for an image to be displayed on a display unit 206 or a working area of the control unit 201.

An operation unit 205 is used to receive an instruction for the mobile phone 200 from the user. The operation unit 205 includes, for example, operation members such as a power button configured to provide, by the user, an instruction for powering ON/OFF the mobile phone 200 and a touch panel formed on the display unit 206.

The display unit 206 is configured to display the image data and display a character for dialogical operation. Note that the display unit 206 is not necessarily included in the mobile phone 200 as long as the mobile phone 200 can be connected to the display unit 206 and has at least the display control function of controlling displaying on the display unit 206.

The recording medium 210 can record the image data output from the image capturing unit 202. The recording medium 210 may be configured detachably from the mobile phone 200, or may be built in the mobile phone 200. That is, the mobile phone 200 may have at least a unit accessible to the recording medium 210.

A communication unit 211 is an interface for connection with an external device. The mobile phone 200 of the present embodiment can exchange data with the digital camera 100 via the communication unit 211. In the present embodiment, the communication unit 211 is an antenna, and the control unit 201 can be connected to the digital camera 100 via the antenna. The communication unit 211 includes an interface for communication via the so-called wireless LAN according to the IEEE 802.11 standards. The control unit 201 controls the communication unit 211 to implement wireless communication with the external device.

Note that for connection with the digital camera 100, direct connection or connection via an access point may be employed. For example. Picture Transfer Protocol over Internet Protocol (PTP/IP) via the wireless LAN can be used as a protocol for data communication. Note that communication with the digital camera 100 is not limited to above. For example, the communication unit 211 may include an infrared communication module, a Bluetooth® communication module, and a wireless communication module such as a wireless USB. Wired connection, such as a USB cable, HDMI®, or IEEE 1394 may be employed.

A near field communication unit 212 includes, for example, an antenna for wireless communication and a modulation/demodulation circuit or a communication controller for processing a wireless signal. The near field communication unit 212 is configured to output a modulated wireless signal from the antenna and demodulate the wireless signal received by the antenna, thereby implementing the near field radio communication according to the IEEE 802.15 standards. In the present embodiment, the near field communication unit 212 communicates with other devices according to IEEE 802.15.1 (Bluetooth®). In the present embodiment, the Bluetooth® communication is Bluetooth® Classic, but other near field communication units may be employed.

A public network communication unit 213 is an interface used when public wireless communication is performed. The mobile phone 200 can make a call to other apparatuses via the public network communication unit 213. At this point, the control unit 201 performs input and output of an audio signal via a microphone 214 and a speaker 215, thereby implementing the call. In the present embodiment, the public network communication unit 213 is an antenna, and the control unit 101 can be connected to a public network via the antenna. Note that the communication unit 211 and the public network communication unit 213 can share a single antenna.

This is description of the mobile phone 200.

<Configuration of Image Management Server 300>

A configuration of an image management server 300 in the present embodiment is similar to that of the mobile phone illustrated in FIG. 2, and therefore, description will be omitted.

<System Configuration>

Figure 3:
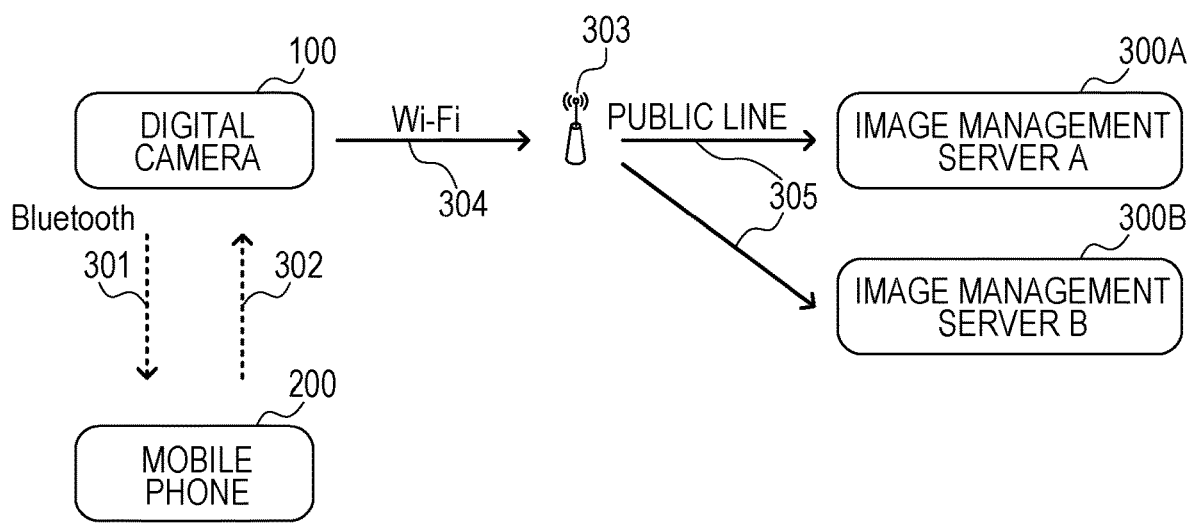
FIG. 3 is a system diagram according to the embodiment.

FIG. 3 is a schematic diagram of a connection form among the digital camera 100, the mobile phone 200, and the image management server 300 in the present embodiment.

The digital camera 100 and the mobile phone 200 are connected to each other via the Bluetooth®, and can communicate with each other as indicated by 301 and 302. Thus, an instruction can be transmitted from the digital camera 100 to the mobile phone 200, and in response to the instruction, the mobile phone 200 can reply a result to the digital camera 100. Moreover, an instruction can be transmitted from the mobile phone 200 to the digital camera 100, and in response to the instruction, the digital camera 100 can reply a result to the mobile phone 200.

The digital camera 100, an image management server 300A, and an image management server 300B are connected to each other via an access point 303. The digital camera 100 and the access point 303 can communicate with each other via the wireless LAN (Wi-Fi®) as indicated by 304. The access point 303, the image management server 300A, and the image management server 300B can communicate with each other via public lines as indicated by 305. Note that although not shown, direct connection to the public line may be made using the public network communication unit 113 of the digital camera 100 as another connection method.

In this system configuration, the digital camera 100 having received the transmission instruction from the mobile phone 200 operates to transmit the image data saved in the recording medium 110 of the digital camera 100 itself to the image management server 300A or the image management server 300B.

<Communication Sequence for Digital Camera 100 and Mobile Phone 200>

Next, the communication sequence of transmitting an instruction from the mobile phone 200 to the digital camera 100 via the near field radio communication and transmitting an image to the image management server 300A or 300B by the digital camera 100 according to such an instruction will be described. Note that the processing of the digital camera 100 in the following sequence and flowchart is implemented in such a manner that the control unit 101 controls each unit of the digital camera 100 according to the program. Moreover, the processing of the mobile phone 200 is implemented in such a manner that the control unit 201 controls each unit of the mobile phone 200 according to the program.

Figure 4:
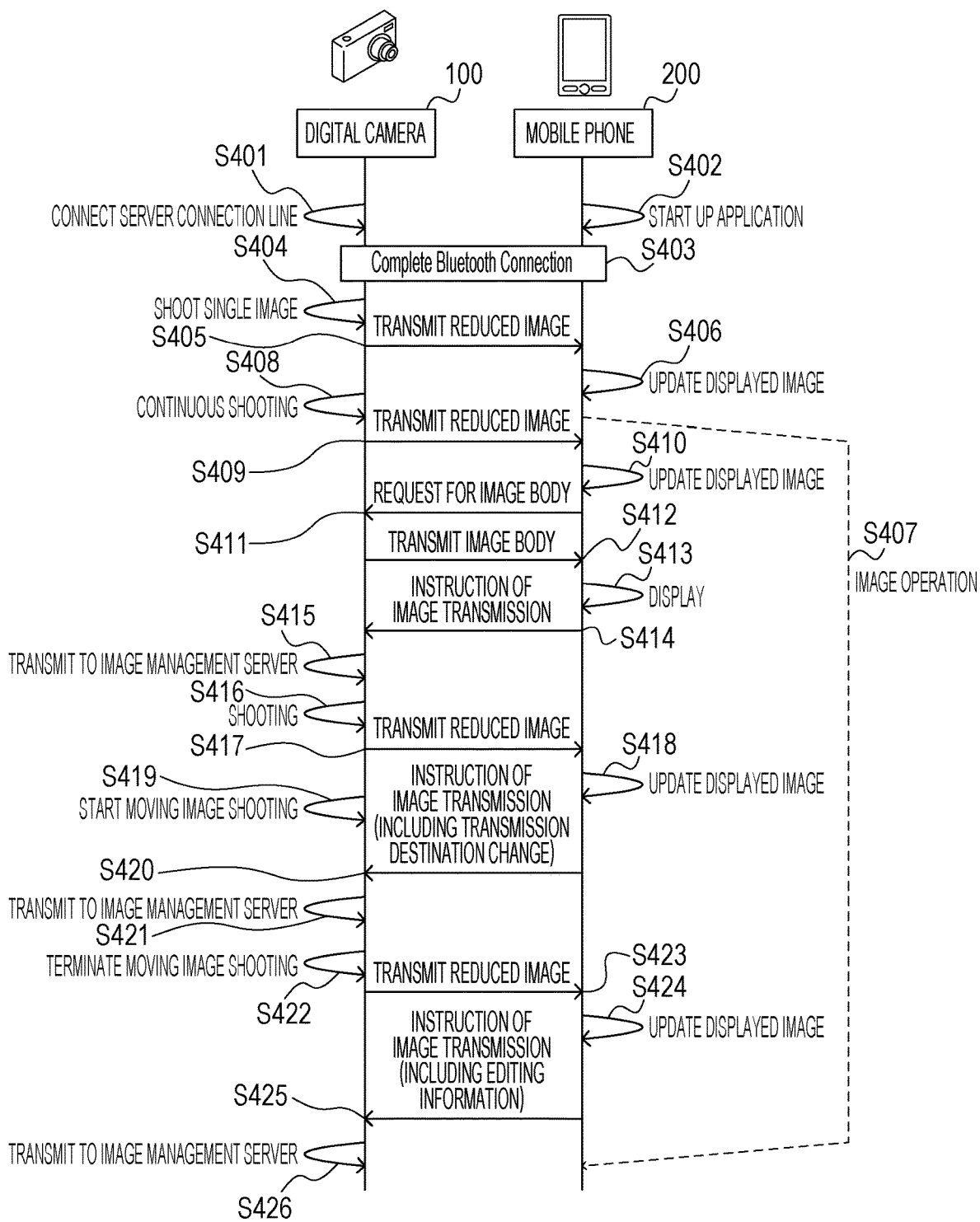
FIG. 4 illustrates a communication sequence between the digital camera and the mobile phone in the embodiment.

FIG. 4 is a communication sequence chart for the digital camera 100 and the mobile phone 200 in the present embodiment.

FIGS. 5A to 5F illustrate a graphical user interface (GUI) for an application for activating the present device, the GUI being displayed on the display unit 206 of the mobile phone 200 in the present embodiment.

Note that the present communication sequence starts from a state in which the digital camera 100 and the mobile phone 200 are started up by power distribution.

First, at S401, the control unit 101 performs such control that the digital camera 100 is connected to a server connection line. In the present embodiment, such control indicates that the communication unit 111 and the access point 303 are brought into a communicable state via the wireless LAN. Note that such a state may be a state in which connection via the public network communication unit 113 is made and connection to the Internet is allowed.

Figure 5A:
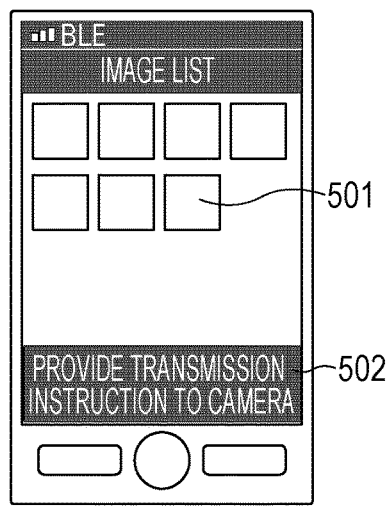
FIGS. 5A to 5F are views of a user interface of the mobile phone in the embodiment.

At S402, when the control unit 201 senses an instruction for starting up an application for activating the present device by user operation, the control unit 201 starts up the application to display a screen illustrated in FIG. 5A. The present application includes a display unit and an operation unit so that an image can be displayed and an instruction for the digital camera 100 can be transmitted. A reference numeral 501 is a region where a reduced image transmitted from the digital camera 100 is displayed. For example, in FIG. 5A, seven reduced images are displayed.

At S403, the control unit 101 and the control unit 201 establish connection using the Bluetooth® via the near field communication unit 112 and the near field communication unit 212. When the camera is started up, the digital camera 100 starts, without a user's instruction, connection via the Bluetooth®. When the application is started up, the mobile phone 200 automatically starts connection via the Bluetooth®. When connection preparation is completed for both of the digital camera 100 and the mobile phone 200, connection is established.

At S404, when the control unit 101 senses that the release button on the operation unit 105 has been pressed by user operation, the control unit 101 executes shooting of a single image. The control unit 101 converts object light formed via the lens included in the image capturing unit 102 into an electrical signal by the image capturing element, and then, performs e.g., the noise reduction processing and outputs digital data as image data. Further, after the data has been temporarily recorded in the working memory 104, such data is recorded as an image file in the recording medium. In the present embodiment, still image shooting will be described as an example, but the same applies to moving image shooting.

At S405, the control unit 101 transmits a reduced image of the captured image to the mobile phone 200 via the near field communication unit 112. Note that the reduced image is an image processed such that the tile size and aspect size thereof are reduced than those of a captured image body, and for example, is embedded in the image in an exchangeable image file format (Exif). After completion of shooting processing, the control unit 101 generates the reduced image embedded in the image or generates the reduced image by processing of the image body, thereby transmitting the reduced image. In the present embodiment, a thumbnail is generated as the reduced image. Note that in a case where the image is generated in a multipicture format, images for displaying with multiple resolutions may be employed. In this case, an image for displaying with a proper resolution can be displayed according to the resolution of the screen.

Figure 5B:
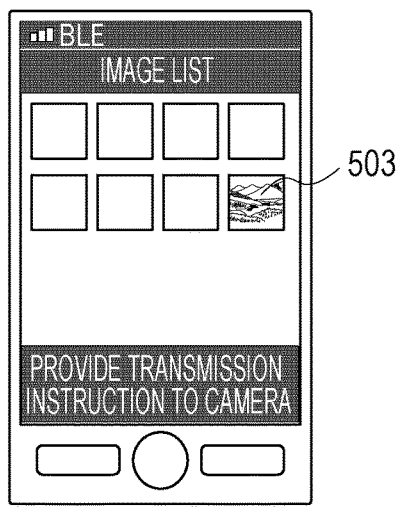

At S406, when the control unit 201 senses that the reduced image has been received via the near field communication unit 212, the control unit 201 displays such a state on the application. A reference numeral 503 of FIG. 5B is the additionally-displayed reduced image. Although not shown, a reduced image transmitted from the digital camera 100 is, as needed, additionally displayed in a reduced image list display area on the application.

At S407, the control unit 201 senses image operation via the operation unit 205 by the user, and performs such processing as necessary. The image operation indicates action illustrated in FIG. 5D. A reference numeral 505 indicates processing for image rating. A reference numeral 506 indicates addition/editing of metadata. The metadata indicates, for example, the Exif or the International Press Telecommunication Council (IPTC), and text information or position information can be added to the image. A reference numeral 507 indicates addition/editing of a note in a case where a comment needs to be added to the image. When editing is completed, an icon indicating completion of editing is displayed on a reduced image display region as indicated by 509 of FIG. 5E. Note that processing reservation is made on the application. Actually, the above-described editing information is added together with the image transmission instruction. After the processing has been actually executed for the image in the digital camera 100, the image is transmitted to the image management server 300A or the image management server 300B.

At S408, when the control unit 101 senses that the release button on the operation unit 105 has been pressed by user operation, the control unit 101 executes continuous shooting. The processing of S404 is continuously performed.

At S409, the control unit 101 transmits the reduced image of the captured image to the mobile phone 200 via the near field communication unit 112. Note that the images are continuously captured in the present embodiment, and therefore, only the reduced image of the head image is transmitted. However, the reduced images of all continuously-captured images may be transmitted.

At S410, when the control unit 201 senses that the reduced image has been received via the near field communication unit 212, the control unit 201 displays such an image on the application. Although not shown, an icon indicating the continuously-captured image can be, in the case of the continuously-captured image, displayed on the displayed reduced image.

At S411, when the control unit 201 senses a request for acquiring the image body via the operation unit 205 by user operation, the control unit 201 provides the request for acquiring the image body to the digital camera 100 via the near field communication unit 212. This is executed in a case where it is, from the reduced image unclear whether or not a desired image has been acquired.

At S412, when the control unit 101 senses the request for acquiring the image body via the near field communication unit 112, the control unit 101 loads the image data into the working memory 104 from the recording medium 110, and transmits the image body to the mobile phone 200.

Figure 5C:
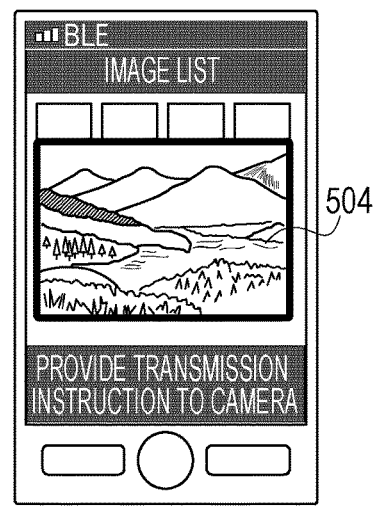
Figure 5D:
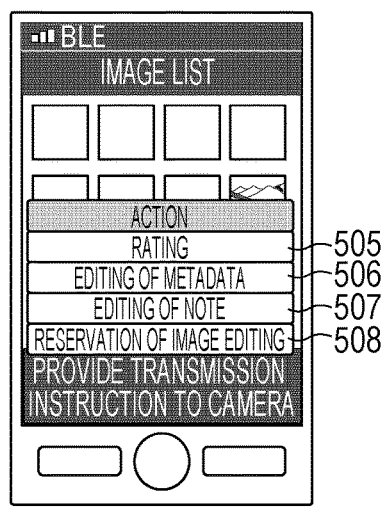
Figure 5E:
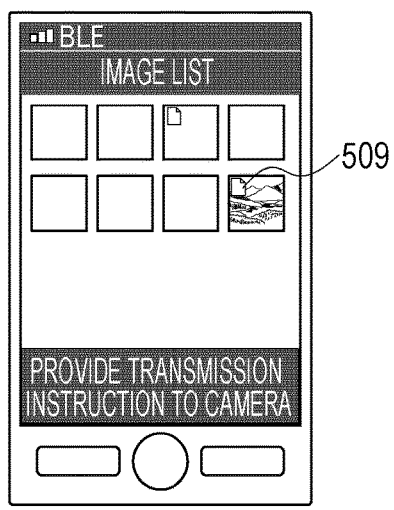
Figure 5F:
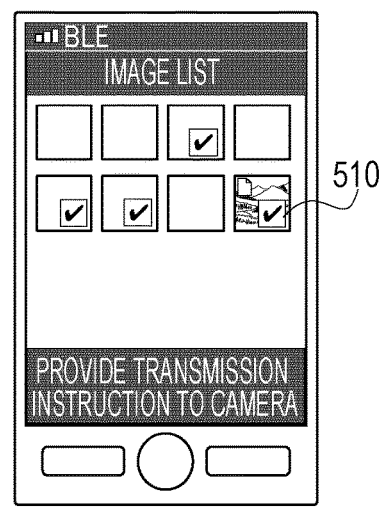

At S413, when the control unit 201 receives the image body from the digital camera 100 via the near field communication unit 212, the control unit 201 displays, on the display unit 206, a preview of the image as indicated by 504 of FIG. 5C. In this manner, the image can be verified in detail.

At S414, when the control unit 201 senses that the user has operated a button 502 of FIG. 5A, the control unit 201 provides, via the near field communication unit 212, an instruction for transmitting the image to the digital camera 100.

At S415, the control unit 101 transmits the designated image to the image management server 300A or 300B via the communication unit 111. Note that a transmission address of the image management server 300A or 300B as a transmission destination is saved in advance in the non-volatile memory 103 of the digital camera 100. The mobile phone 200 sends only information on a transmission target image, and the digital camera 100 transmits the image to the image management server as the transmission destination recorded in the digital camera 100. In the present embodiment, e.g., a Service Set Identifier (SSID) or a Uniform Resource Locator (URL) is used as an address for identifying the image management server. Moreover, information on the server communicating via the communication unit 111 can be set separately from a communication partner communicating via the near field communication unit 212.

At S416, when the control unit 101 senses that the release button on the operation unit 105 has been pressed by user operation, the control unit 101 executes shooting of a single image.

At S417, the control unit 101 transmits a reduced image of the captured image to the mobile phone 200 via the near field communication unit 112.

At S418, when the control unit 201 senses, via the near field communication unit 212, that the reduced image has been received, the control unit 201 displays such an image on the application.

At S419, when the control unit 101 senses that a moving image shooting button on the operation unit 105 has been pressed by user operation, the control unit 101 starts moving image recording.

At S420, when the control unit 201 senses that the button 502 of FIG. 5A has been operated by the user, the control unit 201 provides, via the near field communication unit 212, an instruction for transmitting the image to the digital camera 100.

At S421, the control unit 101 transmits the designated image to the image management server 300A or 300B via the communication unit 111. The transmission destination is saved in advance in the non-volatile memory 203 of the mobile phone 200, and at S414, the transmission address is transmitted to the digital camera 100. In this manner, in a case where there are multiple image management servers as transmission destinations, the transmission destination can be changed as necessary according to an image type.

Even during shooting by the digital camera 100, the image transmission instruction at S420 and transmission of the reduced image at S417 can be executed in parallel.

At S422, when the control unit 101 senses that the moving image shooting button on the operation unit 105 has been pressed by user operation, the control rant 101 stops moving image recording.

At S423, the control unit 101 transmits the reduced image of the captured image to the mobile phone 200 via the near field communication unit 112.

At S424, when the control unit 201 senses that the reduced image has been received via the near field communication unit 212, the control unit 201 displays such an image on the application.

At S425, when the control unit 201 senses that the button 502 of FIG. 5A has been operated by the user, the control unit 201 provides, via the near field communication unit 212, an instruction for transmitting the image to the image management server 300A or the image management server 300B to the digital camera 100. Note that as indicated by 510 of FIG. 5F, the image can be selected from the list of the reduced images to select the image targeted for transmission. At this point, an icon checked for transmission as indicated by 510 is displayed on the reduced image display region. When the button 502 is pressed with multiple images being selected, an instruction for transmitting the multiple images is transmitted to the digital camera 100 via the near field communication unit 212.

At S426, the control unit 101 transmits multiple image bodies as transmission targets to the image management server 300A or the image management server 300B.

This is description of the sequence of transmitting the instruction from the mobile phone 200 to the digital camera 100 via near field communication and transmitting the image from the digital camera 100 to the image management server 300A or 300B in response to the instruction.

<Operation of Digital Camera 100>

Next, operation of the digital camera 100 in the case of transmitting an instruction from the mobile phone 200 to the digital camera 100 via near field wireless communication and transmitting an image from the digital camera 100 according to such an instruction will be described.

Figure 6:
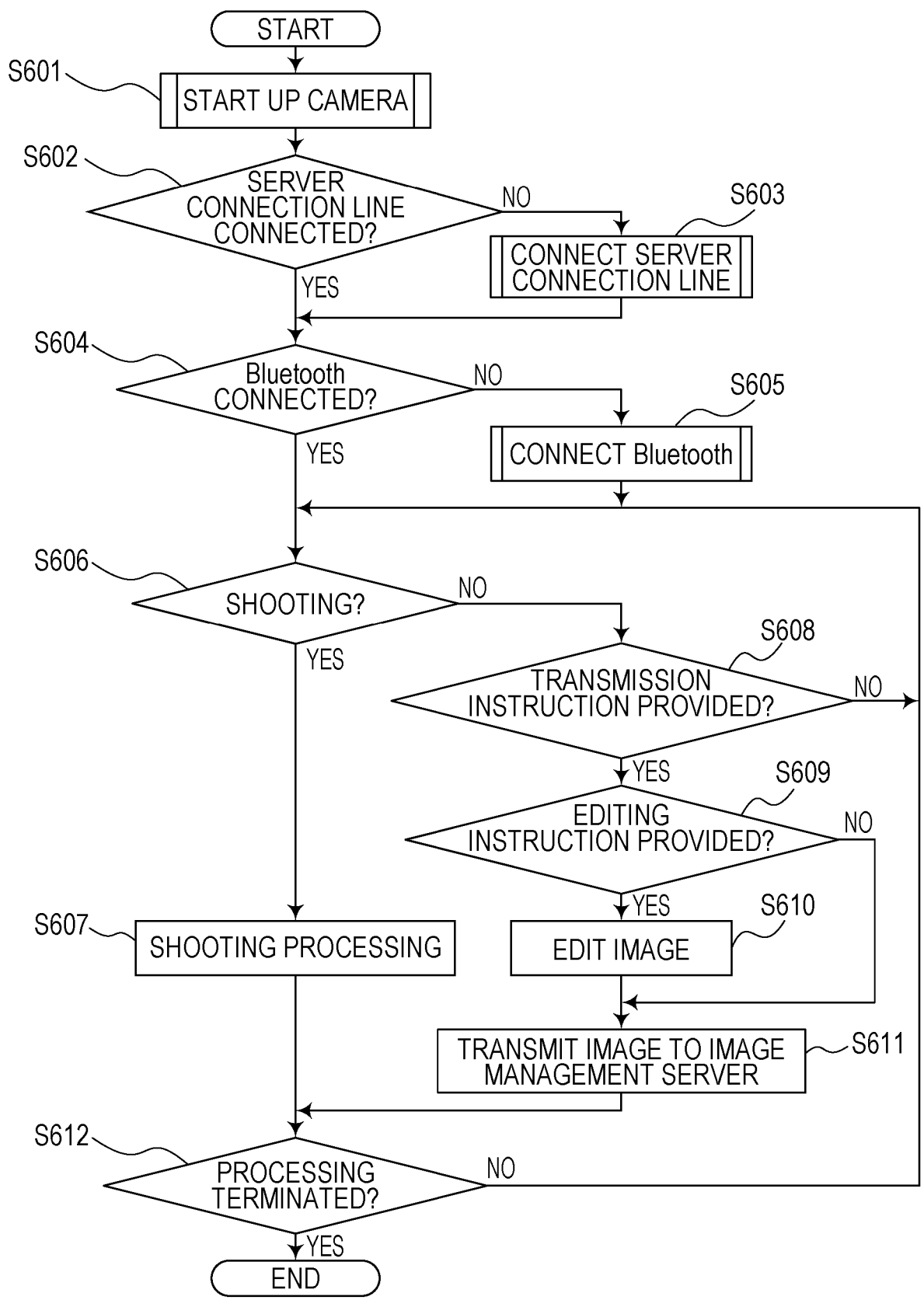
FIG. 6 is a flowchart of the digital camera in the embodiment.

FIG. 6 is a flowchart of operation of the digital camera 100 for implementing the sequence described with reference to FIG. 4.

At S601, the control unit 101 starts up the camera.

At S602, the control unit 101 senses whether or not connection to a connection line connectable to the image management server has been made. In a case where it is sensed that connection has been made, the processing proceeds to S604. If not, the processing proceeds to S603.

At S603, the control unit 101 is connected to the connection line connectable to the image management server. This corresponds to the processing of S401 of FIG. 4.

At S604, the control unit 101 senses whether or not connection to the mobile phone 200 via the Bluetooth® has been made. In a case where it is sensed that connection has been made, the processing proceeds to S606. If not, the processing proceeds to S605.

At S605, the control unit 101 is connected to the mobile phone 200 via the Bluetooth®. This corresponds to the processing of S403 of FIG. 4.

At S606, the control unit 101 senses whether or not shooting operation has been performed. In a case where the shooting operation has been performed, the processing proceeds to S607. If not, the processing proceeds to S608.

At S607, the control unit 101 executes shooting. This corresponds to the processing of S404, S408, S416, S419, and S422 of FIG. 4.

At S608, the control unit 101 senses whether or not the transmission instruction has been provided from the mobile phone 200. In a case where the transmission instruction has been provided, the processing proceeds to S609. If not, the processing proceeds to S606, and is repeated.

At S609 the control unit 101 senses whether or not an image operation instruction has been provided. In a case where the image operation instruction has been provided, the processing proceeds to S610. If not, the processing proceeds to S611.

At S610, the control unit 101 executes the image operation. Data on a body image saved in the recording medium 110 is loaded into the working memory 104, and after execution of image editing such as rating addition, metadata editing, and resize, is saved in the working memory 104.

At S611, the control unit 101 transmits the image data to the image management server 300A or 300B. This corresponds to S415, S421, and S426 of FIG. 4.

At S612, the control unit 101 senses whether or not the present processing has been terminated. In a case where the processing has been terminated the present processing ends. If not, the processing proceeds to S606, and is repeated.

This is description of operation of the digital camera 100.

<Operation of Mobile Phone 200>

Next, operation of the mobile phone 200 in the case of transmitting an instruction from the mobile phone 200 to the digital camera 100 via the near field communication and transmitting an image from the digital camera 100 to the image management server 300A or 300B according to such an instruction will be described.

Figure 7:
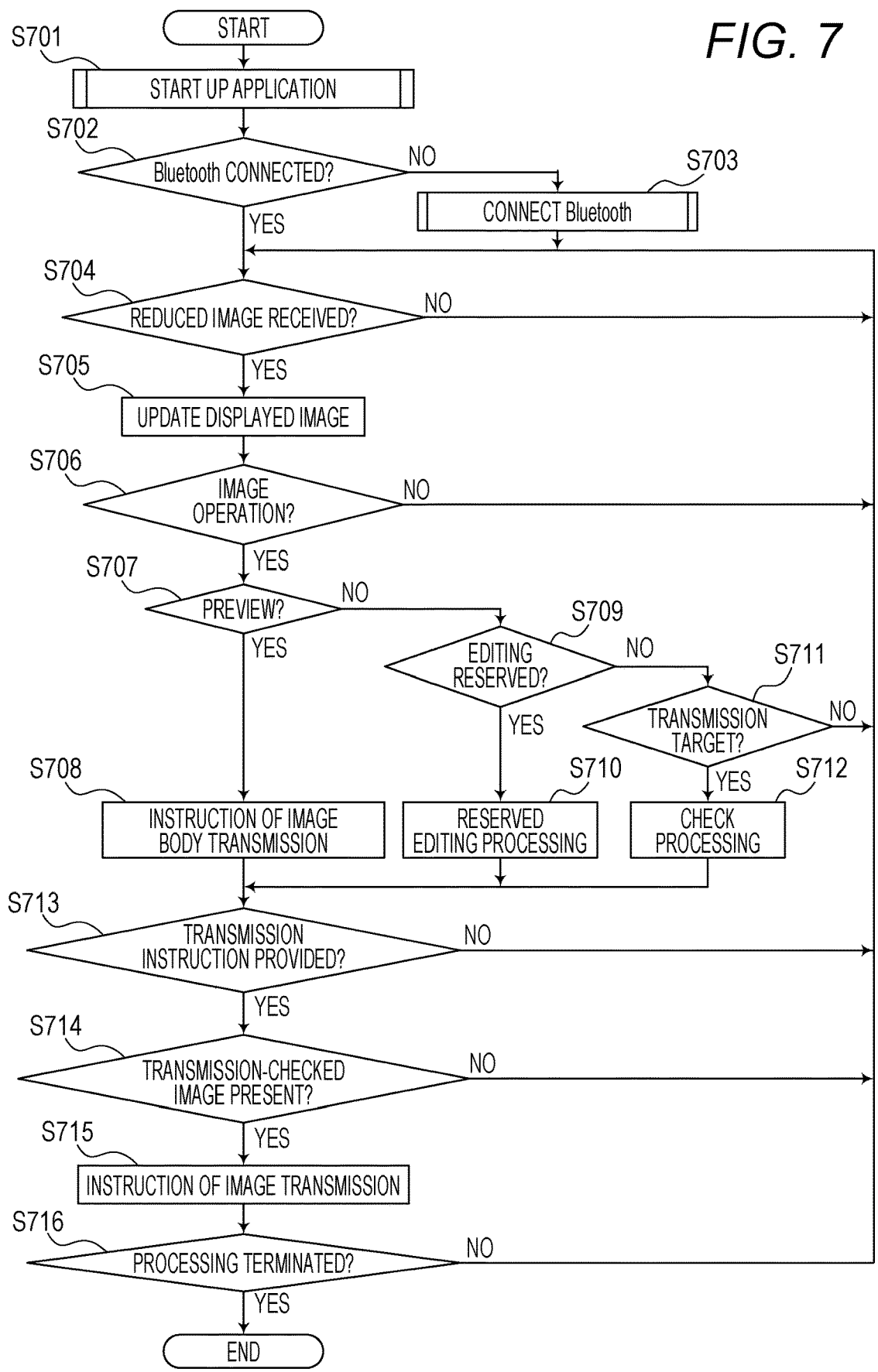
FIG. 7 is a flowchart of the mobile phone in the embodiment.

FIG. 7 is a flowchart of operation of the mobile phone 200 for implementing the sequence described with reference to FIG. 4.

At S701, the control unit 201 starts up the application. This corresponds to the processing of S402 of FIG. 4.

At S702, the control unit 201 senses whether or not connection to the digital camera 100 via the Bluetooth® has been made. In a case where it is sensed that connection has been made, the processing proceeds to S604. If not, the processing proceeds to S703.

At S703, the control unit 201 is connected to the digital camera 100 via the Bluetooth®. This corresponds to the processing of S403 of FIG. 4.

At S704, the control unit 201 senses whether or not a reduced image has been received from the digital camera 100. In a case where the reduced image has been received, the processing proceeds to S705. If not, the processing proceeds to S704, and is repeated.

At S705, the control unit 201 updates the displayed application. This corresponds to the processing of S406, S410, S418, and S424 of FIG. 4.

At S706, the control unit 201 detects whether or not the image operation has been executed. In a case where the image operation has been executed, the processing proceeds to S707. If not, the processing proceeds to S704, and is repeated.

At S707, the control unit 201 senses whether or not the operation of displaying a preview of a body image has been made. In a case where the operation of displaying the preview has been made, the processing proceeds to S708. If not, the processing proceeds to S709.

At S708, the control unit 201 transmits an instruction for displaying the image body to the digital camera 100. This corresponds to the processing of S411 of FIG. 4.

At S709, the control unit 201 senses whether or not reserved editing operation has been made. In a case where the reserved editing operation has been made, the processing proceeds to S710. If not, the processing proceeds to S711.

At S710, the control unit 201 performs reserved editing processing. This corresponds to the processing of S407 of FIG. 4.

At S711, the control unit 201 senses whether or not a transmission target image has been selected. In a case where the transmission target image has been selected, the processing proceeds to S712. If not, the processing proceeds to S704, and is repeated.

At S712, the control unit 201 performs check processing for the transmission target image. This corresponds to the processing of S407 of FIG. 4 and processing partially described regarding S424 and S425 of FIG. 4.

At S713, the control unit 201 senses whether or not an instruction for image transmission to the digital camera 100 has been provided. In a case where the instruction for image transmission has been provided, the processing proceeds to S714. If not, the processing proceeds to S704, and is repeated.

At S714, the control unit 201 senses whether or not there is a transmission target image. In a case where the transmission target image is present, the processing proceeds to S715. If not, the processing proceeds to S704, and is repeated.

At S715, the control unit 201 provides an instruction for image transmission. This corresponds to the processing of S414, S420, and S425 of FIG. 4.

At S716, the control unit 201 senses whether or not the present processing has been terminated. In a case where the processing has been terminated, the present processing ends. If not, the processing proceeds to S704, and is repeated.

This is description of operation of the mobile phone 200.

In the above-described embodiment, the case of transmitting the reduced image of the still image has been described as an example, but this example is not seen to be limiting. For example, in the case of transmitting a moving image, a first frame or a representative frame may be transmitted. In the case of a RAW image, a developed image generated by development processing based on an instruction from an external device may be transmitted. In the case of transmitting continuously-captured images, one of the multiple continuously-captured images instead of all images may be transmitted as a representative image.

According to the present embodiment, image shooting, image editing and selection, and image transmission are executed in parallel, and therefore, a captured image can be, with high immediacy, transmitted to the image management server. Connection to the wireless LAN is made at S401 of FIG. 4. However, for further reducing power consumption, a method may be employed in which connection to the wireless LAN is made after the transmission instruction has been provided from the mobile phone 200.

Second Embodiment

In the first embodiment, the procedure of performing the processing at the digital camera 100 in response to the image transmission instruction with the image editing instruction from the mobile phone 200 and transmitting the edited image to the image management server has been described.

However, there might be a case where an instruction for editing unable to be performed at the digital camera 100 is provided, for example. In this case, after connection via the Bluetooth® has been completed at S403 of FIG. 4, the digital camera 100 transmits, as a capability value, the list of functions editable by the digital camera 100 to the mobile phone 200. In response to such information, the mobile phone 200 may switch a displayed menu of action in the image operation of FIG. 5D. In this manner, no input of an impossible editing instruction is made, and therefore, a smoother transmission procedure can be implemented.

Other Embodiments

In the present embodiment, connection between the digital camera and the PC has been described as an example, but the type of device is not specifically limited. An output device such as a printer or a mobile terminal such as a smartphone or a tablet may be employed.

Moreover, the digital camera 100 having the wireless communication function has been described as an example in the present embodiment, but a configuration in which a recording medium wing wireless communication is attached to the digital camera 100 to control wireless communication as a recording medium may be employed. In this case, control similar to that of the present embodiment is performed for a wireless circuit unit of the recording medium allowing wireless communication.

The present disclosure is also applicable to a system for remote manipulation of the digital camera 100 from, e.g., the PC. In this case, the control unit of the PC makes various inquiries and control requests for the control unit 101 of the digital camera 100, and therefore, the remote manipulation can be implemented.

In addition, contents transmitted to the PC are deleted in the above-described embodiments, but the method for discarding the contents is not specifically limited to deletion. For example, security may be improved by, e.g., encryption of the contents, and the processing of making access from a third party more difficult may be performed.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-081160, filed Apr. 20, 2018, which is hereby incorporated by reference herein in its entirety.

What is claimed is:

1. A communication device comprising:
   a recording unit configured to record an image and a reduced image corresponding to the image;
   a first communication unit;
   a second communication unit with a faster communication speed than that of the first communication unit;
   a setting unit configured to set, for each communication unit, an external device connected via the first communication unit or the second communication unit; and
   a control unit configured to perform control such that the reduced image is transmitted, via the first communication unit, to the external device set as the external device connected via the first communication unit and the image is transmitted, via the second communication unit, to the external device set as the external device connected via the second communication unit in a case where an instruction for transmitting the image corresponding to the reduced image has been received from the external device set as the external device connected via the first communication unit,
   wherein power consumption of the first communication unit is lower than power consumption of the second communication unit, and
   wherein the external device set as the external device connected via the first communication unit and the external device set as the external device connected via the second communication unit are different devices.

2. The communication device according to claim 1, wherein the setting unit sets a Service Set Identifier (SSID) or a Uniform Resource Locator (URL) as information for identifying the external device to be connected.

3. The communication device according to claim 1, wherein a setting of the external device to be connected by the setting unit is changeable via a user operation.

4. The communication device according to claim 1, wherein a change in a transmission destination is settable in every instruction for transmitting, the image from the external device set as the external device connected via the first communication unit to the communication device.

5. The communication device according to claim 1, wherein the reduced image includes a thumbnail and a display image and the image is a non-reduced image.

6. The communication device according to claim 1, wherein the first communication unit receives any instruction of image transmission, designation of the image to be transmitted, and image editing from the external device set as the external device connected via the first communication unit.

7. The communication device according to claim 1, further comprising:
an addition unit configured to add metadata to the image, wherein the metadata includes text information and position information, and
wherein information to be added as the metadata is received, via the first communication unit, from the external device set as the external device connected via the first communication unit.

8. The communication device according to claim 1, wherein the first communication unit receives an instruction for editing the image corresponding to the reduced image from the external device set as the external device connected via the first communication unit, and
wherein in a case where the image editing provided in the instruction is editing unacceptable by the communication device, the control unit performs control such that the image corresponding to the reduced image is transmitted, via the second communication unit, to the external device set as the external device connected via the first communication unit.

9. The communication device according to claim 1, wherein in a case where the image corresponding to the reduced image is a RAW image, the control unit performs control such that development processing is executed based on an instruction from the external device set as the external device connected via the first communication unit and a developed image is transmitted, via the second communication unit, to the external device set as the external device connected via the second communication unit.

10. The communication device according to claim 1, wherein the recording unit further records a moving image, and
wherein in a case where information regarding the moving image is transmitted to the external device set as the external device connected via the first communication unit, the control unit performs control such that a first frame or a representative frame is transmitted, via the first communication unit, to the external device set as the external device connected via the first communication unit.

11. The communication device according to claim 1, further comprising:
an image capturing unit,
wherein the image is generated by the image capturing unit.

12. The communication device according to claim 11, wherein the image capturing unit further includes a function of continuously capturing images of an object,
wherein the recording unit further records multiple images obtained by continuous shooting, and
wherein in a case where information regarding the multiple images obtained by the continuous shooting is transmitted to the external device set as the external device connected via the first communication unit, the control unit performs control such that a representative image of the multiple images obtained by the continuous shooting is transmitted, via the first communication unit, to the external device set as the external device connected via the first communication unit.

13. A method for controlling a communication device including a recording unit configured to record an image and a reduced image corresponding to the image, a first communication unit, a second communication unit with a faster communication speed than that of the first communication unit, the method comprising:
setting, for each communication unit, an external device connected via the first communication unit or the second communication unit; and
performing control such that the reduced image is transmitted, via the first communication unit, to the external device set as the external device connected via the first communication unit and the image is transmitted, via the second communication unit, to the external device set as the external device connected via the second communication unit in a case where an instruction for transmitting the image corresponding to the reduced image has been received from the external device set as the external device connected via the first communication unit,
wherein power consumption of the first communication unit is lower than power consumption of the second communication unit, and
wherein the external device set as the external device connected via the first communication unit and the external device set as the external device connected via the second communication unit are different devices.

14. A non-transitory computer readable storage medium for storing a computer-readable program for causing a computer to execute a method for controlling a communication device including a recording unit configured to record an image and a reduced image corresponding to the image, a first communication unit, and a second communication unit a faster communication speed than that of the first communication unit, the method comprising:
setting, for each communication unit, an external device connected via the first communication unit or the second communication unit, and
performing control such that the reduced image is transmitted, via the first communication unit, to the external device set as the external device connected via the first communication unit and the image is transmitted, via the second communication unit, to the external device set as the external device connected via the second communication unit in a case where an instruction for transmitting the image corresponding to the reduced image has been received from the external device set as the external device connected via the first communication unit,
wherein power consumption of the first communication unit is lower than power consumption of the second communication unit, and
wherein the external device set as the external device connected via, the first communication unit and the external device set as the external device connected via the second communication unit are different devices.

* * * * *